US012803301B2

(12) United States Patent
Velagapudi et al.

(10) Patent No.: US 12,803,301 B2
(45) **Date of Patent: *Nov. 17, 2026**

(54) POWER MANAGEMENT UNIT BATTERY SWITCHOVER TOPOLOGY

(71) Applicant: Raytheon Company, Waltham, MA (US)

(72) Inventors: Mahitha Velagapudi, Allen, TX (US); Stephen John Fedigan, Marana, AZ (US); Eric C. Maugans, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 883 days.

This patent is subject to a terminal disclaimer.

(21) Appl. No.: 18/131,166

(22) Filed: Apr. 5, 2023

(65) Prior Publication Data

US 2024/0339845 A1 Oct. 10, 2024

(51) Int. Cl.
*H02J 7/50* (2026.01)
*H01M 10/65* (2014.01)
(Continued)

(52) U.S. Cl.
CPC ............ *H02J 7/575* (2026.01); *H01M 10/65* (2015.04); *H02J 7/80* (2026.01); *H02J 7/855* (2026.01); *H02J 9/061* (2013.01)

(58) Field of Classification Search
CPC ........................................ H02J 7/575
(Continued)

(56) References Cited

U.S. PATENT DOCUMENTS 3,639,773 A * 2/1972 Ayd, III ............... H01M 6/5011 307/66
3,693,068 A * 9/1972 Bogue ..................... H01M 6/50 320/124

(Continued)

FOREIGN PATENT DOCUMENTS

WO 2023022456 A1 2/2023

OTHER PUBLICATIONS

International Search Report and Written Opinion for counterpart application No. PCT/US2024/014204 mailed May 8, 2024.

*Primary Examiner* — Jerry D Robbins
(74) *Attorney, Agent, or Firm* — Bachman & LaPointe, P.C.

(57) ABSTRACT

A power management unit having battery switchover topology including a first battery in operative communication with a first battery first power switch in parallel with a first battery second power switch, and in operative communication with a first battery power dump unit; a second battery in operative communication with a second battery first power switch in parallel with a second battery second power switch, and in operative communication with a second battery power dump unit; an nth battery in operative communication with an nth battery first power switch in parallel with an nth battery second power switch; the first battery, the second battery and the nth battery are connected to a bus that supplies an electrical load; and the electrical load being supplied sequentially by a first battery current from the first battery, a second battery current from the second battery, and an nth battery current from the nth battery.

12 Claims, 1 Drawing Sheet

(51) Int. Cl.

| | |
|---|---|
| ***H02J 7/00*** | (2006.01) |
| ***H02J 7/80*** | (2026.01) |
| ***H02J 9/06*** | (2006.01) |

(58) Field of Classification Search

USPC .......................................................... 320/116

See application file for complete search history.

(56) References Cited

U.S. PATENT DOCUMENTS

| | | | | |
|---|---|---|---|---|
| 3,767,933 | A | 10/1973 | Bogue et al. | |
| 6,268,711 | B1 | 7/2001 | Bearfield | |
| 7,763,993 | B2 | 7/2010 | Groff et al. | |
| 7,893,561 | B2 | 2/2011 | Weidenheimer et al. | |
| 8,330,419 | B2 | 12/2012 | Kim et al. | |
| 8,508,191 | B2 | 8/2013 | Kim et al. | |
| 10,529,995 | B2 * | 1/2020 | Miller, Jr. | H01M 6/42 |
| 2019/0299799 | A1 | 10/2019 | Hinterberger et al. | |
| 2021/0151993 | A1 | 5/2021 | Tao et al. | |
| 2022/0115879 | A1 * | 4/2022 | Kahn | H01M 10/4257 |
| 2022/0220867 | A1 * | 7/2022 | O'Donnell | F01K 3/02 |
| 2022/0393488 | A1 * | 12/2022 | Chen | B60L 3/0046 |
| 2024/0113705 | A1 * | 4/2024 | Mauder | H03K 17/063 |

* cited by examiner

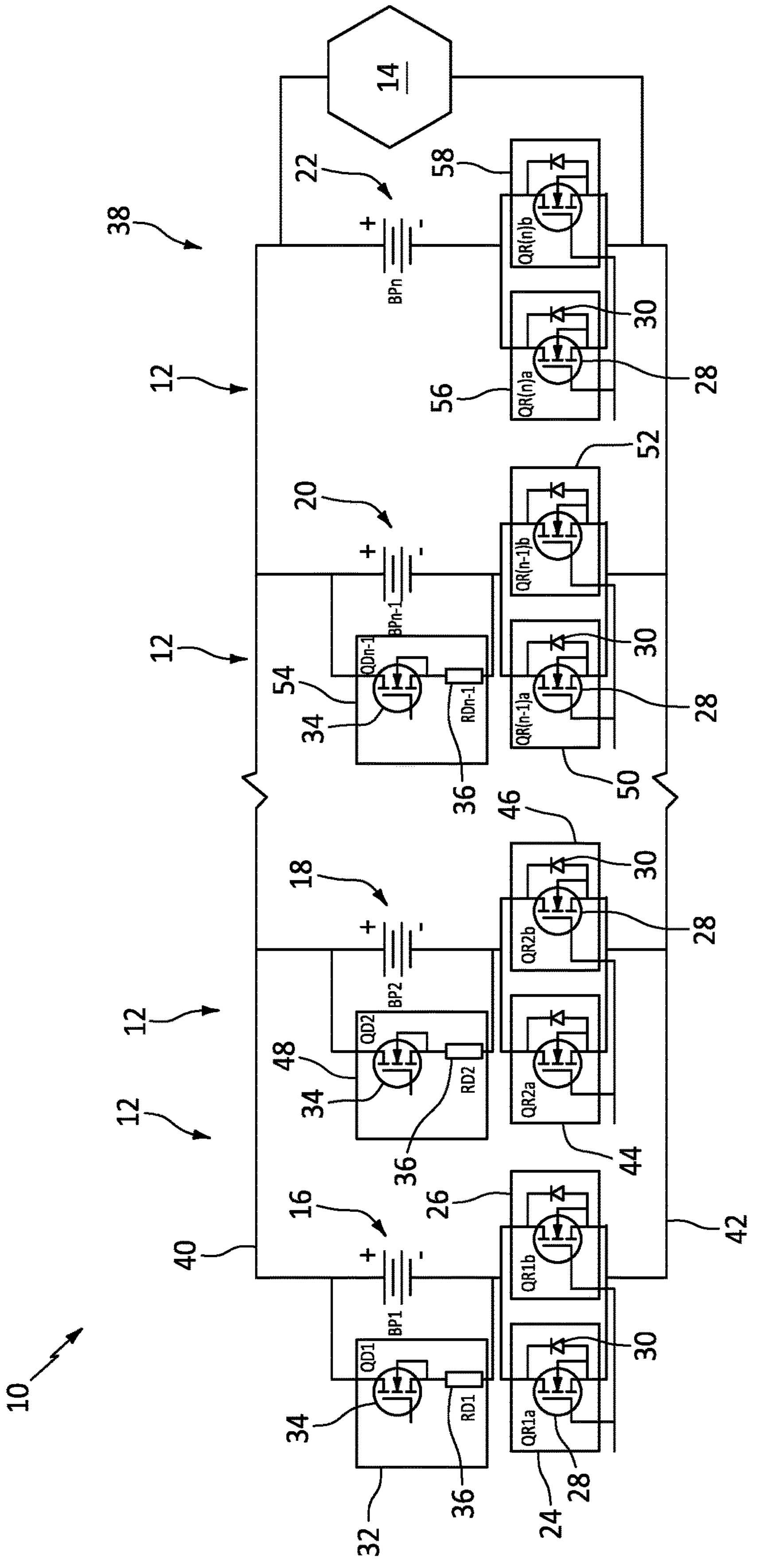
14
22
38
58
BPn
QR(n)b
QR(n)a
30
28
56
12
20
52
BPn-1
QDn-1
QR(n-1)b
QR(n-1)a
54
34
RDn-1
36
50
46
18
BP2
QD2
QR2b
QR2a
48
RD2
44
16
26
40
42
BP1
QD1
QR1b
QR1a
RD1
10
32
24

POWER MANAGEMENT UNIT BATTERY SWITCHOVER TOPOLOGY

BACKGROUND

The present disclosure is directed to a power management unit battery switchover topology that enables sequential firing of thermal batteries.

Certain critical power applications require an electrical power source capable of ultrahigh reliability and ultralow maintenance and virtually unlimited shelf life. In such batteries, the electrodes are fully assembled for operation, but the electrolyte is held in reserve in a separate container which may be within the battery container. Since there is no consumption of the electrodes under these circumstances, the shelf life of the battery is essentially indefinite. However, once the electrolyte is released from its reserve container, such as by mechanical puncture, explosive squib rupture or by any other means as are well known in the art, the battery is activated and thereafter has a limited standby life. Thermal batteries are useful for applications requiring extended storage time because they avoid deterioration of the active materials during storage and eliminate the loss of capacity due to self-discharge. A key feature is that the electrolyte is frozen at room temperature and is melted by the activation of heat pellets. Thermal batteries can have multiple chemistries. For example, a eutectic mixture of inorganic salts with inorganic binder can serve as the electrolyte between the anode and the cathode. A conductive heat source, consisting of iron and potassium perchlorate, is placed between each cell. When initiated, the heat pellets ignite, releasing heat and melting the eutectic electrolyte, producing voltage and current.

A thermal battery is totally inert and non-reactive until activated. Because most external environments have little or no effect on the inactivated battery, it can be stored for 20+years. The battery can be activated at any time without preparation and will begin supplying power almost immediately. After activation, the battery quickly reaches peak voltage, which declines gradually during the rest of its active life as it cools to room temperature. Once activated, the battery functions until a critical active material is exhausted or until the battery cools below the electrolyte's melting point.

Initiating thermal batteries simultaneously constrains a mission for a limited duration of time to provide the necessary electrical power to the electrical loads. There are certain conditions and/or missions that require a longer period of battery power available.

Thermal batteries can be utilized in groups such that a first battery can be activated and at a future point in time, a subsequent battery can be activated to take on the load. However, the first battery being taken offline is susceptible to thermal runaway conditions if the power being produced is not properly managed. The offline battery can go into a thermal runaway condition and have venting problems unless a minimum current is drawn from the offline battery to a point in time when the voltage drops below a value of 10% of full voltage.

What is needed is a battery switchover topology that allows for sequential firing of thermal batteries extending available battery power as well as allowing for offline battery management without the unwanted heat loads in the battery staging electronics package.

SUMMARY

In accordance with the present disclosure, there is provided a power management unit having battery switchover topology comprising a first battery in operative communication with a first battery first power switch in parallel with a first battery second power switch, the first battery in operative communication with a first battery power dump unit; a second battery in operative communication with a second battery first power switch in parallel with a second battery second power switch, the second battery in operative communication with a second battery power dump unit; up to an nth battery in operative communication with an nth battery first power switch in parallel with an nth battery second power switch; the first battery, the second battery and the nth battery are connected to a bus configured to supply an electrical load; and the electrical load being supplied sequentially by a first battery current from the first battery, a second battery current from the second battery, and up to an nth battery current from the nth battery.

A further embodiment of any of the foregoing embodiments may additionally and/or alternatively include the first battery is a thermal battery, the second battery is a thermal battery up to the nth battery is a thermal battery.

A further embodiment of any of the foregoing embodiments may additionally and/or alternatively include the first battery is activated before the second battery is activated; an n−1th battery is activated before the nth battery is activated.

A further embodiment of any of the foregoing embodiments may additionally and/or alternatively include the first battery power dump unit is configured to pull the first battery current from the first battery until the first battery voltage reaches a target voltage of 10 percent of a full voltage value responsive to the first battery going offline.

A further embodiment of any of the foregoing embodiments may additionally and/or alternatively include the second battery power dump unit is configured to pull the second battery current from the second battery until the second battery voltage reaches a target voltage of 10 percent of a full voltage value responsive to the second battery going offline.

A further embodiment of any of the foregoing embodiments may additionally and/or alternatively include each of the first battery first power switch and the first battery second power switch; the second battery first power switch and the second battery second power switch; up to the nth battery first power switch and the nth battery second power switch are on the low side of the load.

A further embodiment of any of the foregoing embodiments may additionally and/or alternatively include each of the power dump units include a dump MOSFET connected to a dump resistor.

A further embodiment of any of the foregoing embodiments may additionally and/or alternatively include each of the battery power switches includes a FET and a diode, the battery power switches are oriented to diode steer the current.

A further embodiment of any of the foregoing embodiments may additionally and/or alternatively include each of the power switches are configured to be scaled.

In accordance with the present disclosure, there is provided a process for sequential battery operation utilizing a power management unit having battery switchover topology comprising operatively connecting a first thermal battery with a first battery first power switch in parallel with a first battery second power switch, operatively connecting the first thermal battery with a first battery power dump unit; operatively connecting a second thermal battery with a second battery first power switch in parallel with a second battery second power switch, operatively connecting the second thermal battery with a second battery power dump unit;

operatively connecting an nth thermal battery in operative communication with an nth battery first power switch in parallel with an nth battery second power switch; connecting the first thermal battery, the second thermal battery up to the nth thermal battery to a bus configured to supply an electrical load; and suppling sequentially a first battery current from the first thermal battery to the electrical load, a second battery current from the second thermal battery to the electrical load, and up to an nth battery current from the nth thermal battery to the electrical load.

A further embodiment of any of the foregoing embodiments may additionally and/or alternatively include the process further comprising activating the first thermal battery before the second thermal battery is activated; activating an n−1th thermal battery before the nth thermal battery is activated; and activating the nth thermal battery last.

A further embodiment of any of the foregoing embodiments may additionally and/or alternatively include the process further comprising pulling the first battery current from the first thermal battery employing the first battery power dump unit until the first thermal battery voltage reaches a target voltage of 10 percent of a full voltage value responsive to the first thermal battery going offline.

A further embodiment of any of the foregoing embodiments may additionally and/or alternatively include the process further comprising pulling the second battery current from the second thermal battery employing the second battery power dump unit until the second thermal battery voltage reaches a target voltage of 10 percent of a full voltage value responsive to the second thermal battery going offline.

A further embodiment of any of the foregoing embodiments may additionally and/or alternatively include each of the power dump units include a dump MOSFET connected to a dump resistor.

A further embodiment of any of the foregoing embodiments may additionally and/or alternatively include each of the battery power switches includes a FET and a diode, orienting the battery power switches to diode steer the current.

A further embodiment of any of the foregoing embodiments may additionally and/or alternatively include the process further comprising configuring each of the power switches to be scaled.

Other details of the power management unit battery switchover topology are set forth in the following detailed description and the accompanying drawings wherein like reference numerals depict like elements.

BRIEF DESCRIPTION OF THE DRAWINGS

FIG. 1 is a schematic representation of an exemplary power management unit battery switchover topology.

DETAILED DESCRIPTION

Referring now to FIG. 1, a power management unit 10 with battery switchover topology is shown. The power management unit 10 includes a grouping of batteries 12 that can be used to energize an electrical load 14. The electrical load 14 can be part of a missile, such as a control actuation system (not shown). The batteries 12 can be thermal batteries, lead acid batteries, Li-Ion and the like. In an exemplary embodiment as shown, there are shown a first battery 16, a second battery 18, a third battery 20, up to an nth battery 22. It is contemplated that multiple batteries 12 can be utilized. The batteries 12 can be utilized sequentially in order to lengthen the mission of the missile.

The first battery 16 can be in operative communication with a first battery first power switch 24 in parallel with a first battery second power switch 26. The first battery first power switch 24 and first battery second power switch 26 can be collectively called power switches 24, 26. The power switches 24, 26 can be configured with a transistor 28, such as for example a power transistor, a Field Effect Transistor (FET), a Metal Oxide Semiconductor Field Effect Transistor (MOSFET), insulated-gate bipolar transistor (IGBT) and the like. The power switches 24, 26 can be configured with a diode 30, such as a body diode.

The power switches 24, 26 are coupled on the low side of the load 14. The power switches 24, 26 can have the transistor connected to a ground (not shown). The battery power switches 24, 26 are oriented to diode steer the current. The body diode 30, is configured to steer the current which means the voltage cannot be turned off, which is an important safety feature. The bus voltage will be the highest battery voltage and cannot be removed by errant logic. Turning on the power switches 24, 26 reduces the power dissipation, since the on-resistance is less than the voltage drop across the body diode 30, even in reverse conduction. The power switches 24, 26 utilize silicon carbide technology to improve the packaging and the power density. Each of the power switches 24, 26 are configured to be scaled. The power switches 24, 26 can enable a path for reverse current into one of the batteries 12 during regeneration from the control actuation system.

The first battery 16 can be in operative communication with a first battery power dump unit 32. The power dump unit 32 can include a dump MOSFET 34 connected to a dump resistor 36. The power dump unit 32 is configured to pull the first battery current from the first battery 16 until the first battery voltage reaches a target voltage of 10 percent of a full voltage value responsive to the first battery going offline. The dump resistor 36 can be used as an electric load to measure a battery internal resistance during power delivery, such that a battery electrochemical impedance spectroscopy can be performed. The dump MOSFET can be configured to have a duty cycle adjusted verses time to produce a constant current dissipation.

The batteries 12 are connected to a bus 38 with a positive side 40 and a negative side 42. The bus 38 connects the batteries 12 to the load 14. The electrical load 14 is supplied sequentially by a first battery current from the first battery 16, a second battery current from the second battery 18, a third battery current from the third battery 20 up to an nth battery current from the nth battery 22.

The second battery 18 includes the similar arrangement as the first battery 16. The second battery 18 is in operative communication with a second battery first power switch 44 in parallel with a second battery second power switch 46. The second battery 18 is in operative communication with a second battery power dump unit 48. The second battery first power switch 44 and second power switch 46 are configured similarly to the first battery first power switch 24 and second power switch 26. There is a transistor 28 and a diode 30 in operative communication. The second battery power dump unit 48 is configured similarly to the first battery power dump unit 32. There is a dump MOSFET 34 and a dump resistor 36 in operative communication.

The third battery or (n−1th battery) 20 includes the similar arrangement as the first battery 16 and second battery 18. The third battery 20 is in operative communication with a third battery first power switch 50 in parallel with a third battery second power switch 52. The third battery 20 is in operative communication with a third battery power dump unit 54. The third battery first power switch 50 and second power switch 52 are configured similarly to the first battery first power switch 24 and second power switch 26. There is a transistor 28 and a diode 30 in operative communication. The third battery power dump unit 54 is configured similarly to the first battery power dump unit 32 and second battery power dump unit 48. There is a dump MOSFET 34 and a dump resistor 36 in operative communication.

The nth battery 22 includes the similar arrangement as the first battery 16 and second battery 18 and third battery 20 except the nth battery 22 does not have a power dump unit 32, 48, 54. The nth battery 22 is configured to be the last battery utilized in the sequence of batteries 12. There is no need to include a power dump unit 32, 48, 54, because the nth battery will be used until it is out of power, and there will not be another battery running online after it. The nth battery 20 is in operative communication with an nth battery first power switch 56 in parallel with an nth battery second power switch 58. The nth battery first power switch 56 and second power switch 58 are configured similarly to the first battery first power switch 24 and second power switch 26. There is a transistor 28 and a diode 30 in operative communication.

The thermal batteries 12 can be utilized in groups such that the first battery 16 can be activated and at a future point in time, a subsequent battery 18, 20, 22 can be activated to take on the load 14. However, the first battery 18 being taken offline is susceptible to thermal runaway conditions if the power being produced is not properly managed. The offline battery can go into a thermal runaway condition and have venting problems unless a minimum current is drawn from the offline battery to a point in time when the voltage drops below a value of 10% of full voltage. Power resistors 36 can be used to dissipate the offline thermal battery power being produced. Once the thermal battery 12 is taken offline, the thermal battery 12 is discharged using the power dump unit 32, 48, 54, in constant current mode to ensure thermal limits are not exceeded. Subsequent online thermal batteries (2nd, $3^{rd}$/n−1th) will need a similar treatment, once taken offline.

A technical advantage of the disclosed power management unit battery switchover topology includes enabling thermal batteries to support mission durations greater than 10 minutes.

Another technical advantage of the disclosed power management unit battery switchover topology includes enabling the sequential firing of thermal batteries while maintaining safety.

Another technical advantage of the disclosed power management unit battery switchover topology includes enabling a first battery to be activated at the beginning of a mission and additional batteries can be activated during the mission to support longer missions.

Another technical advantage of the disclosed power management unit battery switchover topology includes a flexible solution which permits stages to be added, such as batteries being combined in series or in parallel.

Another technical advantage of the disclosed power management unit battery switchover topology includes the capability to ensure power continuity between battery stages during transition/hand off from one battery to another battery.

Another technical advantage of the disclosed power management unit battery switchover topology includes use of any single use power source application.

Another technical advantage of the disclosed power management unit battery switchover topology includes a topology which is adapted for any commercial application that requires sequential fired batteries.

Another technical advantage of the disclosed power management unit battery switchover topology includes a power topology which permits regeneration into the active battery eliminating the need for a high-valued capacitor to handle reverse current flow.

There has been provided a power management unit battery switchover topology. While the power management unit battery switchover topology has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A power management unit having battery switchover topology comprising:

a first battery in operative communication with a first battery first power switch in parallel with a first battery second power switch, the first battery in operative communication with a first battery power dump unit, wherein the first battery power dump unit is configured to pull the first battery current from the first battery until the first battery voltage reaches a target voltage of 10 percent of a full voltage value responsive to the first battery going offline;

a second battery in operative communication with a second battery first power switch in parallel with a second battery second power switch, the second battery in operative communication with a second battery power dump unit, wherein the second battery power dump unit is configured to pull the second battery current from the second battery until the second battery voltage reaches a target voltage of 10 percent of a full voltage value responsive to the second battery going offline;

an nth battery in operative communication with an nth battery first power switch in parallel with an nth battery second power switch;

the first battery, the second battery and the nth battery are connected to a bus configured to supply an electrical load; and the electrical load being supplied sequentially by a first battery current from the first battery, a second battery current from the second battery, and up to an nth battery current from the nth battery.

2. The power management unit having battery switchover topology according to claim 1, wherein the first battery is a thermal battery, the second battery is a thermal battery up to the nth battery is a thermal battery.

3. The power management unit having battery switchover topology according to claim 1, wherein the first battery is activated before the second battery is activated; an n−1th battery is activated before the nth battery is activated.

4. The power management unit having battery switchover topology according to claim 1, wherein each of the first battery first power switch and the first battery second power switch; the second battery first power switch and the second battery second power switch; up to the nth battery first power switch and the nth battery second power switch are on the low side of the load.

5. The power management unit having battery switchover topology according to claim 1, wherein each of the power dump units include a dump MOSFET connected to a dump resistor.

6. The power management unit having battery switchover topology according to claim 1, wherein each of the battery power switches includes a FET and a diode, the battery power switches are oriented to diode steer the current.

7. The power management unit having battery switchover topology according to claim 1, wherein each of the power switches are configured to be scaled.

8. A process for sequential battery operation utilizing a power management unit having battery switchover topology comprising:

operatively connecting a first thermal battery with a first battery first power switch in parallel with a first battery second power switch, operatively connecting the first thermal battery with a first battery power dump unit;

operatively connecting a second thermal battery with a second battery first power switch in parallel with a second battery second power switch, operatively connecting the second thermal battery with a second battery power dump unit;

operatively connecting up to an nth thermal battery in operative communication with an nth battery first power switch in parallel with an nth battery second power switch;

connecting the first thermal battery, the second thermal battery and up to the nth thermal battery to a bus configured to supply an electrical load; and supplying sequentially a first battery current from the first thermal battery to the electrical load, a second battery current from the second thermal battery to the electrical load, and up to an nth battery current from the nth thermal battery to the electrical load; the first thermal battery being activated before the second thermal battery is activated, the n−1th thermal battery being activated before the nth thermal battery is activated, and the nth thermal battery being activated last;

after the second thermal battery is activated, pulling the first thermal battery current from the first thermal battery employing the first battery power dump unit until the first thermal battery voltage reaches a target voltage of 10 percent of a full voltage value responsive to the first thermal battery going offline; and after the n−1th thermal battery is activated, pulling the second thermal battery current from the second thermal battery employing the second battery power dump unit until the second thermal battery voltage reaches a target voltage of 10 percent of a full voltage value responsive to the second thermal battery going offline.

9. The process of claim 8, further comprising:

activating the first thermal battery before the second thermal battery is activated;

activating an n−1th thermal battery before the nth thermal battery is activated; and activating the nth thermal battery last.

10. The process of claim 8, wherein each of the power dump units include a dump MOSFET connected to a dump resistor.

11. The process of claim 8, wherein each of the battery power switches includes a FET and a diode, orienting the battery power switches to diode steer the current.

12. The process of claim 8, further comprising:

configuring each of the power switches to be scaled.

* * * * *